United States Patent Office 3,215,028
Patented Nov. 2, 1965

3,215,028
MEANS AND METHOD FOR RESTRICTING A SOLID PROPELLANT
Armin C. Pitchford, Bartlesville, Okla., and Hugh J. McSpadden, McGregor, Tex., assignors to Phillips Petroleum Company, a corporation of Delaware
No Drawing. Filed July 9, 1959, Ser. No. 826,893
8 Claims. (Cl. 86—1)

This invention relates to restricting a solid propellant. In one aspect, it relates to an improved method for applying a restricting material to a solid propellant grain. In another aspect, it relates to a novel restricting composition for a solid propellant grain. In still another aspect, the invention relates to a solid propellant grain having incorporated thereon as an integral part thereof, a novel restricting composition.

Solid propellant charges, such as those used in rocket motors, gas generators, and the like, are often fabricated with only selected areas of their surfaces exposed so as to serve as surfaces which are ignited during operation. In order to control the burning or consumption of the propellant material, the remaining surfaces thereof are usually covered with relatively noncombustible materials, generally referred to in the art as burning restricting materials, to prevent ignition of these surfaces. Rubber compounds such as the various synthetic rubbers or natural rubber are usually preferred as the restricting composition. Prior art methods of restrictor applications usually involved wrapping the previously sheeted rubber restrictor around the periphery of rod or cylindrical shaped grains, and stitching the rubber sheeting in place and then placing the restricted propellant grain in a vacuum apparatus for cure. For other configurations of propellant, such as booster cogs, rubber strips are hand-stitched in place and subsequently cured under vacuum. Such techniques require an unusual expenditure of manhours and are not readily adaptable to production methods.

It is an object of this invention to provide an improved method for applying rubber restricting materials to a solid propellant grain. It is also an object of this invention to provide a novel restricting composition for application to a solid propellant grain. A further object of this invention is the provision of a burning restricting composition for application to a solid propellant grain which accomplishes other functions in addition to the restricting of burning including absorption of shock and insulation from heat exchange. Still another object of this invention is the provision of a method for applying restrictor materials to a solid propellant grain which is applicable to modern production methods.

Broadly, the invention involves the application of the restricting material to the solid propellant grain by merely wrapping the grain with sheets or strips of the restricting material, placing the loosely wrapped grain into a cure mold and applying pressure while curing in an oven. When the restricting composition is applied to a solid propellant grain comprising a solid inorganic oxidizing salt and a rubber binder, no adhesive is necessary because the rubber restricting composition will adhere tightly to the propellant upon curing. According to the practice of the invention the restricted surface is covered with multilayers of specially compounded rubbery compositions comprising a low modulus-high elongation layer adjacent the propellant surface, the next layer or layers, of higher modulus and "harder" cure rubber, and the outer layer of flame resistant, hard, tough rubber. The technique involved in the practice of this invention makes possible the use of heated platen molds on a suitable press to provide rapid application of heat and pressure. This procedure permits cure of the propellant prior to application of the restricting composition. The rapid application of heat cures the restricting material in time intervals sufficiently short to prevent the overheating and thus, auto-ignition of the propellant. The rubber restrictor also serves to insulate the grain during the curing process.

Various kinds of synthetic rubber formulations are applicable for use in the multilayer restricting compositions of this invention and the following tabulation presents some of the preferred systems. A particularly preferred combination of compositions for a three-ply restricting composition is shown as parts per hundred parts of rubber (phr.) in the following Table I.

TABLE I

|  | Inner Ply | Center Ply | Outer Ply |
|---|---|---|---|
| Restrictor Formulation | A (phr.) | B (phr.) | C (phr.) |
| Ingredients: | | | |
| GR-S 1505 [a] | 100.00 | 100.00 | |
| Bd/MVP (85:15) | | | 100.00 |
| Furnace Carbon Black | 35.00 | | 110.00 |
| Flexamine [1] | 1.50 | 1.50 | 3.00 |
| Wood Rosin | 5.00 | 3.00 | |
| Stearic Acid | 1.00 | 1.50 | 1.50 |
| Sulfur | 0.25 | 2.50 | 10.00 |
| Zinc Oxide | 1.00 | 3.00 | 5.00 |
| Butyl Eight [2] | 1.00 | 3.00 | 2.00 |
| Graphite | | | 25.00 |
| Paraffin | | | 1.00 |
| Philrich 5 [6] | | | 15.00 |
| Dioctyl Adipate | | 10.00 | |
| Hy Flo Super Cel [5] | | 40.00 | |
| Total | 144.75 | 164.50 | 272.50 |

See footnotes at end of Table III, col. 3.

Other compositions which are particularly applicable for use in the present invention are shown in Tables II and III.

TABLE II.—COMPOSITION OF CENTER PLY

|  | D | E | F | G | B |
|---|---|---|---|---|---|
| GR-S 1505 [a] | 100.00 | 100.00 | 100.00 | 100.00 | 100.00 |
| Furnace Carbon Black | 35.00 | 35.00 | | | |
| Flexamine [1] | 1.50 | 1.50 | 1.50 | 1.50 | 1.50 |
| Wood Rosin | 3.00 | 5.00 | 3.00 | 3.00 | 3.00 |
| Stearic Acid | 1.50 | 1.00 | 1.50 | 1.50 | 1.50 |
| Sulfur | 2.50 | 0.25 | 2.50 | 2.50 | 2.50 |
| Zinc Oxide | 3.00 | 1.00 | 3.00 | 3.00 | 3.00 |
| Butyl Eight [2] | 3.00 | 1.00 | 3.00 | 3.00 | 3.00 |
| Dioctyl Adipate | 10.00 | | 10.00 | 10.00 | 10.00 |
| Asbestos Powder | | 75.00 | | | |
| Thermax [3] | | | 40.00 | | |
| Super Floss [4] | | | | 40.00 | |
| Hy Flo Super Cel [5] | | | | | 40.00 |

See footnotes at end of Table III, col. 3.

TABLE III.—COMPOSITION OF OUTER PLY

|  | H | I | J | C |
|---|---|---|---|---|
| GR-S 1505 [a] | 100.00 | 100.00 | 100.00 | |
| Bd/MVP (85:15) | | | | 100.00 |
| Furnace Carbon Black | 35.00 | | | 110.00 |
| Flexamine [1] | 1.50 | 1.50 | 1.50 | 3.00 |
| Wood Rosin | 3.00 | 3.00 | 3.00 | |
| Stearic Acid | 1.50 | 1.50 | 1.50 | 1.50 |
| Sulfur | 2.50 | 2.50 | 2.50 | 10.00 |
| Zinc Oxide | 3.00 | 3.00 | 3.00 | 5.00 |
| Butyl Eight [2] | 6.00 | 3.00 | 3.00 | 2.00 |
| Dioctyl Adipate | 10.00 | | | |
| Hy Flo Super Cel [5] | | | 200.00 | |
| Graphite | | | | 25.00 |
| Philrich-5 [5] | | 10.00 | 10.00 | 15.00 |
| Paraffin | | | | 1.00 |
| Hi-Sil 233 [7] | | 90.00 | | |

[a] Government Reserve butadiene-styrene rubber.
[1] Flexamine—65% of a complex diarylamine-ketone reaction product and 35% of N,N'-diphenyl-p-phenylenediamine.
[2] Butyl-Eight—A rubber cure accelerator of the dithiocarbamate type. It is a brown liquid with distinct odor; specific gravity 1.01; partially soluble in water and gasoline; soluble in acetone, benzene, carbon disulfide and chloroform.
[3] Thermax—A soft semi-reinforcing carbon for rubber compounding, consisting of finely divided carbon obtained by the thermal decomposition or cracking of natural gas. Specific gravity 1.80.
[4] Super Floss—One of the Celite mineral fillers. It is used in polishing compositions where a non-scratching abrasive is desired. The structure of the particles is especially thin-walled permitting rapid breakdown on a slight application of pressure. The average particle size is 2-4 microns and the free moisture content is 1 percent or less. The specific gravity is about 2.00 and only approximately 1 percent is retained on a 325-mesh screen.
[5] Hy Flo Super Cel—One of the Celite series of filter aids made with high grade diatomaceous silica. It finds commercial application for the complete removal by filtration of solid particles from animal fats and oils, fish oils, dyestuffs, grape juice, liquid soap, molasses, maltose, shellac, vegetable oils, dry cleaner solvents, sugar, syrups, and the like.
[6] Philrich-5—A highly aromatic oil used as an extender and softener in the compounding of synthetic rubber.
[7] Hi-Sil 233—A white hydrated silica of extremely fine particle size. Specific gravity 1.95, bulk density 10 pounds per cubic foot. Average particle size 0.02-0.03 micron. It is widely used as a reinforcing filler for synthetic, natural and silicone rubber stocks.

It is to be understood that all of the presently known rubbers, including natural rubber and the synthetic rubbers such as butadiene-styrene, polybutadiene, polysulfide rubber, and the like, can be used in the practice of this invention. It is recognized that certain limits should be placed on the preferred formulations of rubber so that the various layers used will have the characteristics desired of the finished product. The preferred range of deviation from the optimum characteristics of the formulations for the various layers is shown in the following Table IV.

TABLE IV

|  | Minimum | Optimum | Maximum |
|---|---|---|---|
| Restrictor Thickness: | | | |
| 1st Ply | 0.010 | 0.02 | 0.050 |
| 2nd Ply | 0.020 | 0.03 | 0.050 |
| 3rd Ply | 0.020 | 0.05 | None |
| Cure (Heated Mold): | | | |
| Pressure During Cure | 50 | 100 | 300 |
| Cure Temperature, F. | 225 | 250 | 275 |
| Cure Time, minutes | 5 | 10 | 15 |
| Cure (Unheated Mold): | | | |
| Pressure, p.s.i. | 50 | 100 | 300 |
| Cure Temperature | 150 | 190 | 210 |
| Cure Time, hours | 12 | 24 | 36 |
| Characteristics of Restrictors: | | | |
| 1st Ply (Inner): | | | |
| Elongation, percent | 100 | 300 | None |
| Modulus, 300%, p.s.i. | 100 | 250 | 400 |
| Tensile, Ultimate, p.s.i. | 100 | 300 | 600 |
| 2nd Ply (Center): | | | |
| Elongation, percent | 100 | 300 | None |
| Modulus, 300%, p.s.i. | 200 | 400 | 550 |
| Tensile, Ultimate, p.s.i. | 300 | 400 | 650 |
| 3rd Ply (Outer): | | | |
| Elongation, percent | 100 | 300 | None |
| Modulus, 300%, p.s.i. | 300 | 800 | 1,200 |
| Tensile, Ultimate, p.s.i. | 500 | 1,000 | 2,500 |
| Shore A | 50-60 | 80-90 | 90-100 |

The inner layer of restrictor acts as an adhesive, a shock absorber, and an insulator. A low modulus, high elongation and low tensile rubber provides these characteristics. The inner ply serves as a bonding agent for joining the outer layer or layers to the grain because the inner ply is compatible with the rubber binder of the grain and with the outer layer or layers of restrictor. Therefore, the inner layer should be thin because of its low tensile strength. This layer can be applied in the form of a sheet or can be applied in the form of a solution in a solvent by dipping or spraying. The inner layer allows for temperature cycling and corresponding expansion and contraction of the propellant as well as acting as a shock absorbent.

The second ply, which will be the outer ply if two layers are used and the center ply if three layers are used, will be similar to the first ply but will cure to a "harder" state with some increase in modulus and an increase in tensile strength.

When the restrictor composition is made up of three layers or plys the outer ply will be a hard, tough, flame-resistant rubber which acts to retard the erosion of the restrictor by the hot gases during firing. This rubber will be a high modulus, high tensile strength rubber.

The two-ply restrictor will be used in installations where the burning time and temperature are not excessive or where insulation is not particularly required. Such installations include small gas generators and separational units that are used to disengage a burned-out rocket stage.

The three-ply restrictor will normally be used in installations where the burning time is in excess of about 10 minutes so that some form of insulation is required to protect the motor case from the temperature of the burning gases. Such installations include rocket motors used in rocket drone targets, rocket propelled torpedoes and the like.

The novel restrictor composition and method for applying such restrictor is applicable to any solid rocket propellant comprising a major amount of a solid organic oxidizing salt and a minor amount of a rubber binder material. Solid rocket propellant compositions of the composite-type which are especially preferred, and which have proven particularly applicable in this invention, are those disclosed and claimed in copending application, Serial No. 284,447, filed April 15, 1952, by W. B. Reynolds et al., and those disclosed and claimed in copending application, Serial No. 561,943, filed January 27, 1956, by W. B. Reynolds et al. The propellant composition disclosed in these copending applications comprise a solid oxidizer and a binder formed by polymerizing a rubber copolymer of a vinyl heterocyclic nitrogen base compound with an open chain conjugated diene. The following empirical formulas or recipes generally are representative of the class of propellant compositions preferred for the preparation of the propellant grains restricted according to this invention.

TABLE V

| Ingredient | Parts Per 100 Parts of Rubber | Parts By Weight |
|---|---|---|
| Binder | | 5-50 |
| Copolymer (Bd/MVP) | 100 | |
| Furnace Carbon Black | 10-30 | |
| Plasticizer | 10-30 | |
| Silica | 0-20 | |
| Metal Oxide | 0-5 | |
| Anti-Oxidant | 0-5 | |
| Wetting Agent | 0-2 | |
| Accelerator | 0-2 | |
| Sulfur | 0-2 | |
| Oxidizer (ammonium nitrate) | | 50-95 |
| Burning Rate Catalyst | | 0-30 |

The polymerizable heterocyclic nitrogen bases which are applicable for the production of polymeric binder materials are those having a vinyl group,

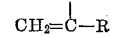

where R is either hydrogen or a methyl group, and are copolymerizable with a conjugated diene. Substituted heterocyclic nitrogen base compounds particularly useful are those selected from the group consisting of pyridine, quinoline, alkyl substituted pyridine and an alkyl substituted quinoline, where the total number of carbon atoms in the nuclear alkyl substituents is not more than 15. Of these, the compounds of the pyridine series are of the greatest commercial interest at present. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10–40, preferably in the range of 15 to 25.

These heterocyclic nitrogen bases can be represented by the following structural formulas:

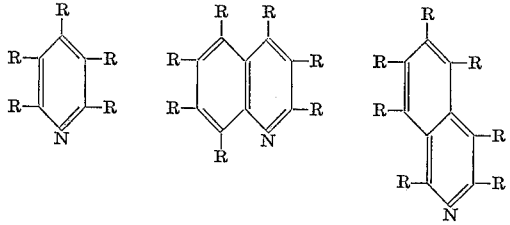

where R is selected from the group consisting of hydrogen, alkyl, vinyl, alphamethylvinyl, alkoxy, halo, hydroxy, cyano, aryloxy, aryl, and combinations of these groups such as haloalkyl, alkylaryl, hydroxyaryl, and the like; one of said groups being selected from the group consisting of vinyl and alpha-methylvinyl; and the total number of carbon atoms in the nuclear substituted groups being not greater than 15. Examples of such compounds are 2-vinylpyridine
2-vinyl-5-ethylpyridine
2-methyl-5-vinylpyridine
4-vinylpyridine
2,3,4-trimethyl-5-vinylpyridine
3,4,5,6-tetramethyl-2-vinylpyridine
3-ethyl-5-vinylpyridine
2,6-diethyl-4-vinylpyridine
2-isopropyl-4-nonyl-5-vinylpyridine
2-methyl-5-undecyl-3-vinylpyridine
2,4-dimethyl-5,6-dipentyl-3-vinylpyridine
2-decyl-5-(alpha-methylvinyl)pyridine
2-vinyl-3-methyl-5-ethylpyridine
2-methoxy-4-chloro-6-vinylpyridine
3-vinyl-5-ethoxypyridine
2-vinyl-4,5-dichloropyridine
2-(alpha-methylvinyl)-4-hydroxy-6-cyanopyridine
2-vinyl-4-phenoxy-5-methylpyridine
2-cyano-5-(alpha-methylvinyl)pyridine
3-vinyl-5-phenylpyridine
2-(para-methyl-phenyl)-3-vinyl-4-methylpyridine
3-vinyl-5-(hydroxyphenyl)-pyridine
2-vinylquinoline
2-vinyl-4-ethylquinoline
3-vinyl-6,7-di-n-propylquinoline
2-methyl-4-nonyl-6-vinylquinoline
4(alpha-methylvinyl)-8-dodecylquinoline
3-vinylisoquinoline
1,6-dimethyl-3-vinylisoquinoline
2-vinyl-4-benzylquinoline
3-vinyl-5-chloroethylquinoline-3-vinyl-5,6-dichloroisoquinoline
2-vinyl-6-ethoxy-7-methylquinoline
3-vinyl-6-hydroxymethylisoquinoline
and the like.

Oxidizers which are applicable in the solid rocket fuel compositions of this invention include ammonium, alkali metal, and alkaline earth metal salts of nitric, perchloric, and chloric acids, and mixtures thereof. Ammonium nitrate and ammonium perchlorate are the preferred oxidizers for use in the solid rocket fuels of this invention. Specific oxidizers include sodium nitrate, potassium perchlorate, lithium chlorate, calcium nitrate, barium perchlorate, and strontium chlorate. Mixtures of oxidizers are also applicable. In the preparation of the solid rocket fuel compositions, the oxidizers are powdered to sizes preferably 10 to 300 microns average particle size. The amount of solid oxidizer employed is usually a major amount of the total composition and is generally in the range between 50 and 90 percent by weight of the total mixture of oxidizer and binder. If desired, however, less than 50 percent by weight of the oxidizer can be used.

Suitable plasticizers useful in preparing these propellant grains include TP-90B (dibutoxyethoxyethyl formal); benzophenones; and Pentaryl A (monoamylbiphenyl). Suitable silicia preparations include a 10–20 micron size range; and Hi-Sil 202, a rubber grade material. A suitable antioxidant is Flexamine, a physical mixture containing 25 percent of a complex diarylamine-ketone reaction product and 35 percent of N,N'-diphenyl-p-phenylenediamine. A suitable wetting agent is Aerosol-OT (dioctyl sodium sulfosuccinate). Satisfactory rubber cure accelerators include Philcure 113 (SA-113, N,N - dimethyl - S - tertiary butylsulfenyl dithiocarbamate); Butyl-8 (a dithiocarbamate-type rubber accelerator); and GMF (quinone dioxime).

Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like.

Reinforcing agents include carbon black, wood flour, lignin, and various reinforcing resins such as styrene-divinylbenzene, methyl acrylate-divinylbenzene, acrylic acid-styrene-divinylbenzene, and methyl acrylate-acrylic acid-divinylbenzene resins. The reinforcing agent is usually used in an amount in the range of 10 to 50 parts by weight per hundred parts by weight of copolymer. The reinforcing agent can be omitted if desired.

The various ingredients in the rocket fuel composition can be mixed on a roll mill or an internal mixer such as a dispersion blade mixer can be employed. The binder forms the continuous phase in the finished fuel composition with the oxidant as the discontinuous phase. Rocket grains are formed by compression molding, injection molding or extrusion. The curing temperature will generally be in the range between 70 and 250° F., preferably between 170 and 200° F.

Specific propellant formulations or recipes proven useful in preparing the grains restricted according to this invention are those set forth in Table VI.

TABLE VI

| Propellant | Parts by Weight | |
|---|---|---|
| | A | B |
| Bd/MVP (90:10) | 10.31 | 10.31 |
| Philblack A | 2.32 | 2.32 |
| Flexamine | 0.31 | 0.31 |
| Zn Oxide | 0.50 | 0.50 |
| MgO | 2.06 | 2.06 |
| ZP-211 [a] | 2.06 | 2.06 |
| NH₄NO₃ | 85.00 | 85.00 |
| Milori Blue | 2.00 | 2.00 |
| Hi-Sil 233 | | 0.50 |
| Butarez [b] | 1.00 | |

[a] Same as TB-90-B with low boiling materials removed.
[b] Liquid polybutadiene.

The following examples will aid in better understanding of the invention but these examples are not to be construed as limiting the invention.

*Example I*

An end-burning propellant grain comprising an extruded rod of propellant formulation A of Table VI was loosely wrapped with a 0.05-inch layer of A, was placed into a cure mold and pressure was applied while the grain was cured in an oven for 12 hours at 190° F. The cured and restricted grain was then wrapped with asbestos paper secured in place by pressure sensitive tape to produce the desired diameter of the charge of fit of 2-inch motor. The charge was fired and a time-pressure trace of the firing indicated an excellent firing, thus demonstrating the superior performance of the restrictor and technique employed.

*Example II*

A two-ply system was evaluated on an end-burning grain similar to that of Example I. A 0.05-inch layer of A comprised the inner ply and an outer ply of D was used and was loosely wrapped around the inner ply after which the grain was placed into a cure mold and pressure was applied while curing in an oven for 12 hours at 190° F. This charge was fired in a 2-inch motor without further insulation and the pressure-time trace indicated an excellent firing. There was no indication of overheating of any portion of the motor.

Prior to our invention, the restrictor contributed little to the insulation of the rocket motor case and relatively massive layers of insulation were required to prevent overheating of motor cases when end-burning grains having a burning time of more than 2 or 3 minutes were utilized.

*Example III*

In test firings of an end-burning grain designed to burn for about 10 minutes wherein a conventional one-ply restrictor was used with asbestos and aluminum foil insulation, the aft end of the motor case, in one of the test firings, attained a temperature of 900° F. whereas a maximum temperature of about 500° F. was desired. In another test firing with similar conventional restrictor and insulation, the motor case burned through and the charge burned out at low pressure and very little thrust.

The practice of this invention provides other advantages including reduction in application time and cost; increased capacity or output, particularly of small units such as gas generator charges; improved adhesion of restrictor to grain and thus improved restriction of burning surfaces; and ready adaptation to production applications. It is also possible to control more accurately the restricted dimensions of the rocket grain.

Reasonable variations and modifications are possible within the scope of the disclosure of the present invention without departing from the spirit and scope of the invention.

That which is claimed is:

1. The method of simultaneously insulating a rocket motor case and restricting the side wall surface of an end burning grain of solid propellant comprising a major amount of a solid inorganic oxidizing salt and a minor amount of a rubber binder which is prepared for use in a rocket motor having a burning period in excess of one minute which comprises applying to that portion of the surface of the grain to be restricted a first layer of about 0.01 to about 0.05 inch in thickness of uncured rubber having a cured 300 percent modulus of less than about 400 p.s.i.; applying upon said first layer at least another layer of at least about 0.02 inch thickness of uncured rubber having higher modulus characteristics than said first layer; supplying sufficient external pressure to said layers of rubber on said grain to maintain said layers and said grain in contiguous contact; and heating said layers at a temperature and for a time sufficient to cure said layers while maintaining said pressure.

2. The method of simultaneously insulating a rocket motor case and restricting the side wall surface of an end burning grain of solid propellant comprising a major amount of solid inorganic oxidizing salt and a minor amount of rubber binder which is prepared for use in a rocket motor having a burning period in excess of one minute which comprises applying to the side wall surface of the grain a first layer of about 0.01 to about 0.05-inch in thickness of uncured rubber having a cured 300 percent modulus of about 100 to about 400 p.s.i. and a cured elongation of at least 100 percent; applying upon said first layer at least one other layer at least about 0.02-inch thickness of uncured rubber having a cured 300 percent modulus of about 200 to about 1200 p.s.i. and a cured tensile strength of about 300 to about 2500 p.s.i.; applying sufficient external pressure to said layers of rubber on said grain to maintain said layers and said grain in contiguous contact; and heating said layers at a temperature in the range of 150 to 275° F. for a time sufficient to cure said layers while maintaining said pressure but insufficient to raise the temperature of said grain above about 190° F.

3. The method of claim 2 wherein the first layer of rubber is about 0.01 to about 0.05-inch in thickness, has an elongation of at least 100 percent, and a modulus of about 100 to about 400 p.s.i.; a second layer is about 0.02 to about 0.05-inch in thickness, has an elongation of at least 100 percent, a modulus of about 200 to about 500 p.s.i. and a tensile strength of about 300 to about 650 p.s.i.; a third layer is at least about 0.02-inch in thickness, has a modulus of about 300 to about 1200 p.s.i. and a tensile strength of about 500 to about 2500 p.s.i.

4. A combined insulated and restricted side wall surface, end burning grain of solid propellant comprising a major amount of solid inorganic oxidizing salt and a minor amount of rubber binder for use in a rocket motor having a burning period in excess of one minute wherein the restricted surface of said grain is covered by an inner layer at least about 0.01 inch in thickness of rubber having a 300 percent modulus of less than about 400 p.s.i. and an outer layer of at least about 0.02 inch in thickness of rubber having higher modulus characteristics than said first layer and the restricting layers of rubber are cured while an external pressure is applied thereto so that a permanent bond results between said layers and said grain.

5. An end burning solid propellant charge for use in a rocket motor having a burning period in excess of one minute comprising a major amount of a solid inorganic oxidizing salt and a minor amount of a rubber binder having the side wall portion of its external surface restricted from burning by an adhering coating consisting essentially of a first layer about 0.01 to about 0.05-inch in thickness of rubber having an elongation of at least 100 percent, and a modulus of about 100 to about 400 p.s.i.; and an outer layer about 0.02 to about 0.05-inch in thickness of rubber having a modulus of about 200 to about 550 p.s.i. and a tensile strength of about 300 to about 650 p.s.i. wherein said layers of rubber insulate the rocket motor from the heat generated by the solid propellant charge.

6. An end burning solid propellant charge for use in a rocket motor having a burning period in excess of one minute comprising a major amount of solid inorganic oxidizing salt and a minor amount of a rubber binder having the side wall portion of its external surface restricted from burning by an adhering coating consisting essentially of a first layer about 0.01 to about 0.05-inch in thickness of rubber having an elongation of at least 100 percent and a modulus about 100 to about 400 p.s.i.; a second layer of about 0.02 to about 0.05-inch in thickness of rubber having a modulus of about 200 to about 550 p.s.i. and a tensile strength of about 300 to about 650 p.s.i.; and a third layer at least about 0.02-inch in thickness of rubber having a modulus of about 300 to about 1200 p.s.i. and a tensile strength of about 500 to about 2500 p.s.i. wherein said layers of rubber insulate the rocket motor from the heat generated by the solid propellant charge.

7. The method of insulating the rocket motor case and restricting the side wall surface of a grain of solid propellant comprising an end burning major amount of a solid inorganic oxidizing salt and a minor amount of a rubber binder wherein the grain is to be used in a rocket motor having a burning period in excess of one minute which comprises applying to that portion of the surface of the grain to be restricted a first layer of about 0.01 to about 0.05 inch in thickness of rubber having a maximum modulus of about 400 p.s.i. and a minimum elongation of about 100 percent; applying upon said first layer at least another layer at least about 0.02 inch thickness of rubber having a minimum modulus of about 200 p.s.i. and a minimum tensile strength of about 300 p.s.i.; supplying sufficient external pressure to said layers of rubber on said grain to maintain said layers and said grain in contiguous contact; and heating said layers at a temperature and for a time sufficient to cure said layers while maintaining said pressure.

8. A restricted side wall, end burning grain of solid propellant comprising a major amount of a solid inorganic oxidizing salt and a minor amount of a rubber binder for use in a rocket motor having a burning period in excess of one minute wherein the restricted surface of the grain is covered by an inner layer of about 0.01 to about 0.05 inch in thickness of rubber having a maximum modulus of about 400 p.s.i. and a minimum elongation of about 100 percent and an outer layer at least about 0.02 inch thickness of rubber having a minimum modulus of about 200 p.s.i. and a minimum tensile strength of about 300 p.s.i. and the restricting layers of rubber are cured while an external pressure is applied thereto so that a permanent bond results between said layers and said grain whereby the layers serve as insulation for the motor case and as restrictor for the grain.

References Cited by the Examiner
UNITED STATES PATENTS

| | | |
|---|---|---|
| 2,479,470 | 8/49 | Carr. |
| 2,479,828 | 8/49 | Geckler. |
| 2,539,404 | 1/51 | Crutchfield et al. |

OTHER REFERENCES

Baker, Missiles and Rockets, vol. 4, No. 6, Aug. 11, 1958, pp. 45–47.

Chemical and Engineering News, Oct. 7, 1957, pp. 62–63.

Dougherty, Chem. Eng. Progress, vol. 53, No. 10, October 1957, pp. 489–92.

CARL D. QUARFORTH, *Primary Examiner.*

LEON D. ROSDOL, ROGER L. CAMPBELL,
*Examiners.*